(12) United States Patent
Maloney

(10) Patent No.: US 8,143,742 B2
(45) Date of Patent: Mar. 27, 2012

(54) POWER DISTRIBUTION CONTROLLER AND RELATED SYSTEMS AND METHODS

(76) Inventor: Michael A Maloney, Woodinville, WA (US)

( * ) Notice: Subject to any disclaimer, the term of this patent is extended or adjusted under 35 U.S.C. 154(b) by 294 days.

(21) Appl. No.: 12/592,553

(22) Filed: Nov. 27, 2009

(65) Prior Publication Data

US 2010/0148579 A1    Jun. 17, 2010

Related U.S. Application Data

(60) Provisional application No. 61/200,313, filed on Nov. 26, 2008.

(51) Int. Cl.
    *H02J 1/10*    (2006.01)
(52) U.S. Cl. .......................................................... 307/20
(58) Field of Classification Search ...................... 307/20
    See application file for complete search history.

(56) References Cited

U.S. PATENT DOCUMENTS

| | | | |
|---|---|---|---|
| 3,005,109 A | 10/1961 | Funkhouser et al. | |
| 5,289,041 A | 2/1994 | Holley | |
| 6,111,391 A | 8/2000 | Cullen | |
| 6,407,465 B1 | 6/2002 | Peltz et al. | |
| 6,731,019 B2 | 5/2004 | Burns et al. | |
| 6,856,041 B2 | 2/2005 | Siebenthaler et al. | |
| 7,239,035 B2 | 7/2007 | Garces et al. | |
| 7,459,799 B2 | 12/2008 | Aldridge et al. | |
| 7,471,011 B2 | 12/2008 | Janssen | |
| 2004/0119291 A1 | 6/2004 | Hamrin | |
| 2004/0222642 A1 | 11/2004 | Siebenthaler et al. | |
| 2005/0040655 A1 | 2/2005 | Wilkins et al. | |
| 2006/0072262 A1 | 4/2006 | Paik et al. | |
| 2006/0112688 A1* | 6/2006 | Vos et al. | 60/598 |
| 2007/0246943 A1 | 10/2007 | Chang et al. | |
| 2008/0172279 A1 | 7/2008 | Enis et al. | |
| 2008/0258467 A1 | 10/2008 | Wilson et al. | |
| 2009/0021011 A1 | 1/2009 | Shifrin et al. | |

OTHER PUBLICATIONS

International Search Report mailed Mar. 18, 2010 from PCT application No. PCT/US2009/006296 filed Nov. 27, 2009.

* cited by examiner

*Primary Examiner* — Robert L. Deberadinis
(74) *Attorney, Agent, or Firm* — Janeway Patent Law PLLC; John Janeway

(57) ABSTRACT

A power distribution controller includes electronic circuitry operable to receive power and distribute power, for simultaneous consumption, to a first power load and to one or more second power loads. The electronic circuitry is also operable to monitor the amount of power consumed by the one or more second power loads, and determine whether or not the received power is or substantially is the maximum amount of power available to be received. In response to the amount of power consumed by the one or more second power loads, and the amount of received power relative to the maximum amount of power available to be received, the electronic circuitry diverts power to the first power load to cause the received power to be or substantially be the maximum amount of power available to be received.

38 Claims, 5 Drawing Sheets

POWER DISTRIBUTION CONTROLLER AND RELATED SYSTEMS AND METHODS

CROSS REFERENCE TO RELATED APPLICATION AND CLAIM OF PRIORITY

This application claims priority from commonly owned U.S. Provisional Patent Application No. 61/200,313, filed 26 Nov. 2008, and titled "Auxiliary Power Generation System and Related Methods", presently pending, which is incorporated by reference.

BACKGROUND

Auxiliary power generation systems generate power, often electrical power, for equipment to use when power from a main provider such as a utility company is out, i.e. temporarily not available, when the equipment is located in a remote area beyond the reach of a utility company's power distribution grid, such as a in a remote village, or when the equipment has unique power requirements that are not effectively satisfied by the power provided by a utility company. Because such auxiliary power generation systems often need to generate power in remote areas, many of such systems generate electrical power from the energy in a fluid such as wind, steam and running water, or from the energy in sunlight.

The systems that generate electrical energy from energy in a fluid typically include a turbine that extracts some of the fluid's energy (in the form of fluid pressure or head) to rotate a turbine shaft, and a generator that takes some of the energy in the rotating turbine shaft to move a magnet, and thus a magnetic field, across an electrically conductive material (typically a coil of copper wire) to generate a voltage in the material. Because fluid flows through the turbine to transfer energy from the fluid to the turbine's shaft, there is a rotational speed of the turbine's shaft at which the maximum amount of energy is extracted from fluid flowing through the turbine. As discussed in greater detail in conjunction with FIG. 2, this optimal speed largely depends on the pressure of the fluid entering the turbine. When electrical energy that is generated by the generator is consumed—i.e. current flows through the conductive material in the generator—the consumption opposes the rotation of the turbine's shaft, in affect acting as a brake on the shaft's rotational speed. Moreover, the magnitude of the opposing force on the turbine's shaft is directly proportional to the rate at which electrical energy is consumed—i.e. the amount of electric power consumed. Thus, the rotational speed of a turbine's shaft depends on the pressure of the fluid flowing through the turbine and the amount of electric power that is consumed.

FIG. 1 is a graph showing a typical relationship between the amount of electric energy 20, in terms of electric power, that a conventional turbine-generator combination can generate from fluid flowing through the turbine, and the fluid pressure 22 when the fluid contacts the turbine's runner. As can be seen, the amount of electric energy 20 that a turbine-generator combination can generate from a flow of fluid is directly proportional to the pressure 22 of the fluid contacting the turbine's runners. FIG. 2 is a graph showing a typical relationship between the rotational speed 24, in revolutions per minute (rpm), of a conventional turbine's shaft and the percent 26 of the total energy in the fluid flowing through the turbine that is converted into kinetic energy expressed in the rotating turbine shaft, for two different specific fluid pressures. This graph is different than the graph shown in FIG. 1, because each of the two curves 27a and 27b in this graph is limited to a specific pressure in the fluid flowing through the turbine. Curve 27a shows a typical relationship between the turbine shaft's rotational speed and the percent of the total energy in the fluid flowing through the turbine that is expressed in the rotating shaft for a fluid pressure of 40 pounds per square inch (psi). Curve 27b shows a typical relationship between the turbine shaft's rotational speed and the percent of the total energy in the fluid flowing through the turbine that is expressed in the rotating shaft for a fluid pressure of 60 psi. For each fluid pressure there is a unique curve similar to the curves 27a and 27b. More specifically, for each specific fluid pressure there is a unique optimal turbine shaft speed, 28a for the curve 27a (40 psi), and 28b for the curve 27b (60 psi), at which a maximum amount of energy is extracted from the fluid flowing through the turbine. And for each specific fluid pressure, rotating the turbine's shaft faster or slower than the optimal speed by, for example, consuming less or more, respectively, electrical power from the generator, reduces the total amount of energy that can be extracted from the fluid flowing through the turbine, and thus reduces the total amount of electric energy that the turbine-generator combination can generate.

FIG. 3 is a graph showing a typical relationship between the pressure 30 of a fluid flowing through the turbine when the fluid contacts the turbine's runner and the rotational speed 32 of the turbine's shaft that provides the maximum percentage of the fluid's total energy that is converted into kinetic energy expressed in the rotating turbine shaft. This graph, like the graph shown in FIG. 1, shows the relationship over a range of fluid pressures. Thus, this graph can be considered a collection of the unique optimal turbine shaft speeds (one of which, 28, is shown in FIG. 2) for each fluid pressure throughout the range of fluid pressures.

From FIGS. 1-3, one can see that the amount of energy transferred from the fluid to the rotation of the turbine's shaft depends on the fluid pressure and the rotational speed of the turbine's shaft. Because the rotational speed of the turbine's shaft also depends on the fluid pressure, and the amount of electric power generated, most power generation systems that include a turbine-generator combination are designed to receive a flow of fluid whose pressure remains constant, and to generate a constant amount of electric power. Furthermore, the fluid pressure and the amount of electric power generated are selected to keep the turbine's shaft rotating at the turbine's optimal speed (28 in FIG. 2) for the specific fluid pressure, and thus allow the turbine-generator combination to extract a maximum amount of energy from the fluid flowing through the turbine.

Unfortunately, in many remote areas where an auxiliary power supply uses water running in a stream or river, or wind moving through a canyon or across a plain, the fluid pressure can vary substantially over time. Consequently, the rotational speed of the turbine, and the amount of power generated, can vary over time. For example, if the fluid pressure is less than the specific pressure that a turbine is designed for, then the turbine's shaft will rotate slower than the optimal speed that transfers the most energy from the wind or running water and the generator will produce less electrical power. Thus, some of the energy in the wind or running water that could be available to generate electrical power may not be utilized. If, on the other hand, the fluid pressure is greater than the specific pressure that the turbine is designed for, then the turbine's shaft will rotate faster than the speed that transfers the most energy from the wind or running water. Although the generator would produce more electrical energy, the available excess power would not oppose the rotation of the turbine's shaft because the excess power would likely not be consumed. Thus the shaft would be allowed to rotate faster than desired. If this overspeed condition is sustained, it may damage the turbine and/or generator equipment such as the bearings for the rotating shaft(s).

SUMMARY

In one aspect of the invention, a power distribution controller includes electronic circuitry operable to receive power and distribute power, for simultaneous consumption, to a first power load and to one or more second power loads. The electronic circuitry is also operable to monitor the amount of power consumed by the one or more second power loads, and determine whether or not the received power is or substantially is the maximum amount of power available to be received. In response to the amount of power consumed by the one or more second power loads, and the amount of received power relative to the maximum amount of power available to be received, the electronic circuitry diverts power to the first power load to cause the received power to be or substantially be the maximum amount of power available to be received.

For example, if the amount of power required by equipment such as a pump for a well (a second power load) connected to the system is 50 watts, and the turbine-generator combination most efficiently generates 100 watts from the fluid pressure in a stream of running water, then the power distribution controller has the generator generate 100 watts and diverts 50 watts of the power to a diversion load (a first power load) such as a heater, a light, a battery, and/or a larger electrical power distribution grid in which power can be supplied to the grid. Then, as the fluid pressure decreases and/or the amount of power consumed by the well pump increases, the power distribution controller diverts less power to the diversion load to allow the turbine's shaft to rotate at the optimal speed that provides the most efficient transfer of energy from the flow of fluid for the specific fluid pressure. If the fluid pressure increases and/or the amount of power consumed by the well pump decreases, then the power distribution controller diverts more power to the diversion load to allow the turbine's shaft to rotate at the optimal speed that provides the most efficient transfer of energy from the fluid flow for the specific fluid pressure. In both circumstances, the turbine's shaft rotates at its optimal speed to allow the maximum amount of power to be extracted from the fluid flowing through the turbine and to maximize the life of the turbine and its components. Thus, with the power distribution controller the maximum available power from running water or wind can be efficiently and easily generated when the fluid pressure varies over time.

DETAILED DESCRIPTION

Figure 4:
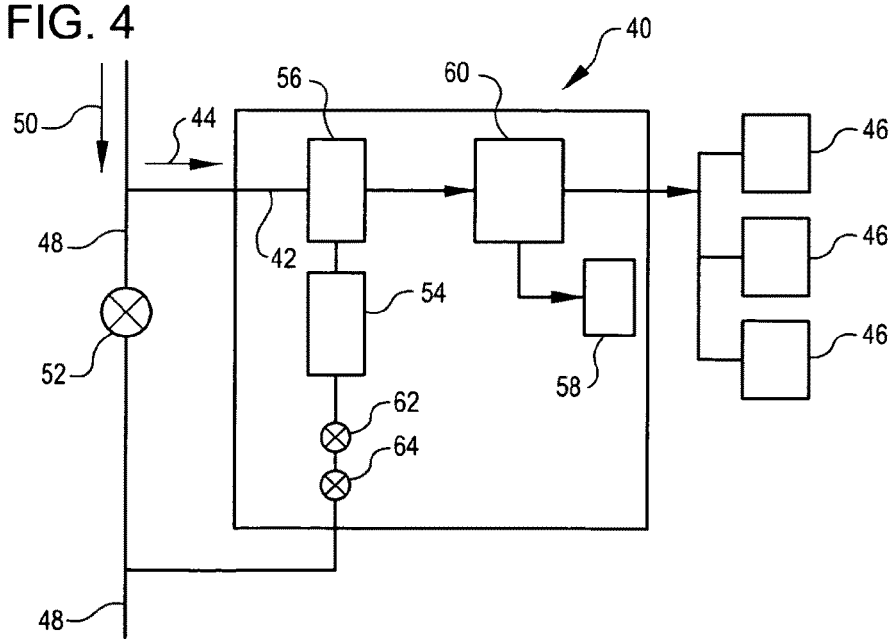
FIG. 4 is a schematic diagram of a power generation system, according to an embodiment of the invention.

FIG. 4 is a schematic diagram of a power generation system 40, according to an embodiment of the invention. The power generation system 40 generates electrical power from a fluid, such as water, wind, steam, heated exhaust gas, flowing through the pipe 42 in the direction indicated by the arrow 44, that one or more second power loads 46 (here three) can consume to perform any desired work, such as pumping water from a well, lighting a room or street, and/or charging a battery. The system 40 is shown, as an example, coupled to a portion of a water distribution network that includes a pipe 48 for distributing water flowing in the direction indicated by the arrow 50, and a valve 52 to reduce the fluid pressure in water before the water enters a residential home (not shown) or commercial building (not shown). The power generation system 40 includes a turbine 54 that receives the water flowing in the pipe 42 and converts some of the energy in the flowing water into kinetic energy expressed in the rotation of the turbine's shaft (not shown). The system 40 also includes a generator 56 coupled to the turbine's shaft that converts the kinetic energy in the turbine's rotating shaft into electrical power. In addition, the power generation system 40 also includes a first power load 58 that can consume power generated by the generator 56, and a power distribution controller 60 that distributes power from the generator 56 to the first power load 58 and the one or more second power loads 46.

Figure 5:
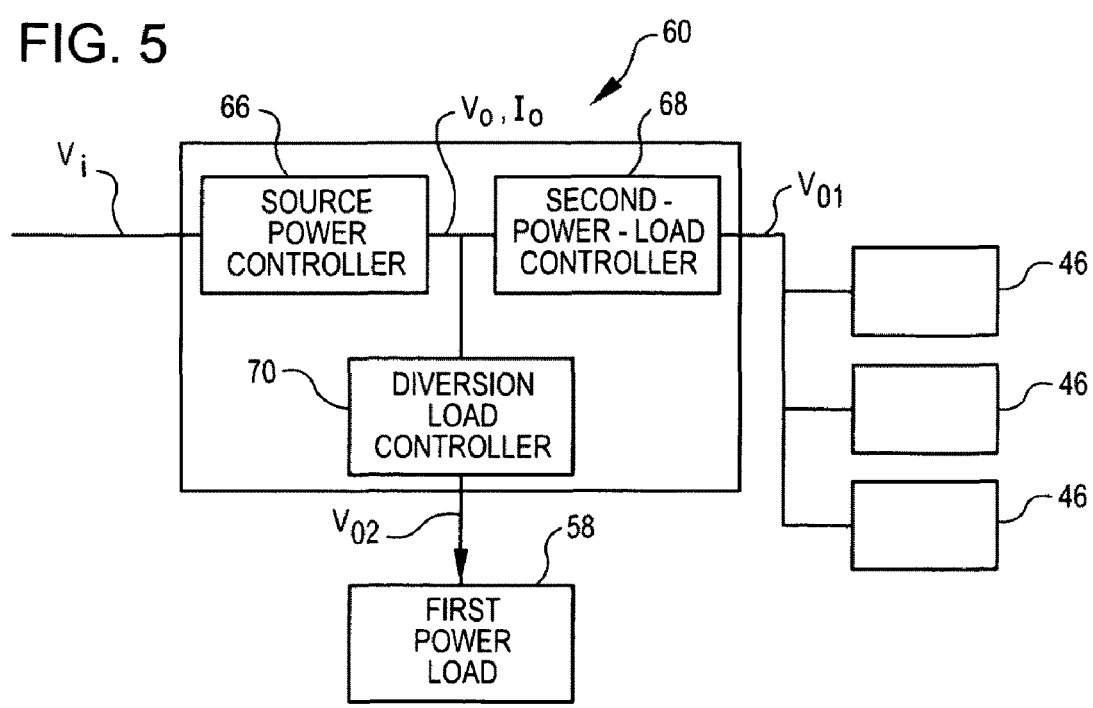
FIG. 5 is a schematic diagram of a power distribution controller shown in FIG. 4, according to an embodiment of the invention.
Figure 6:
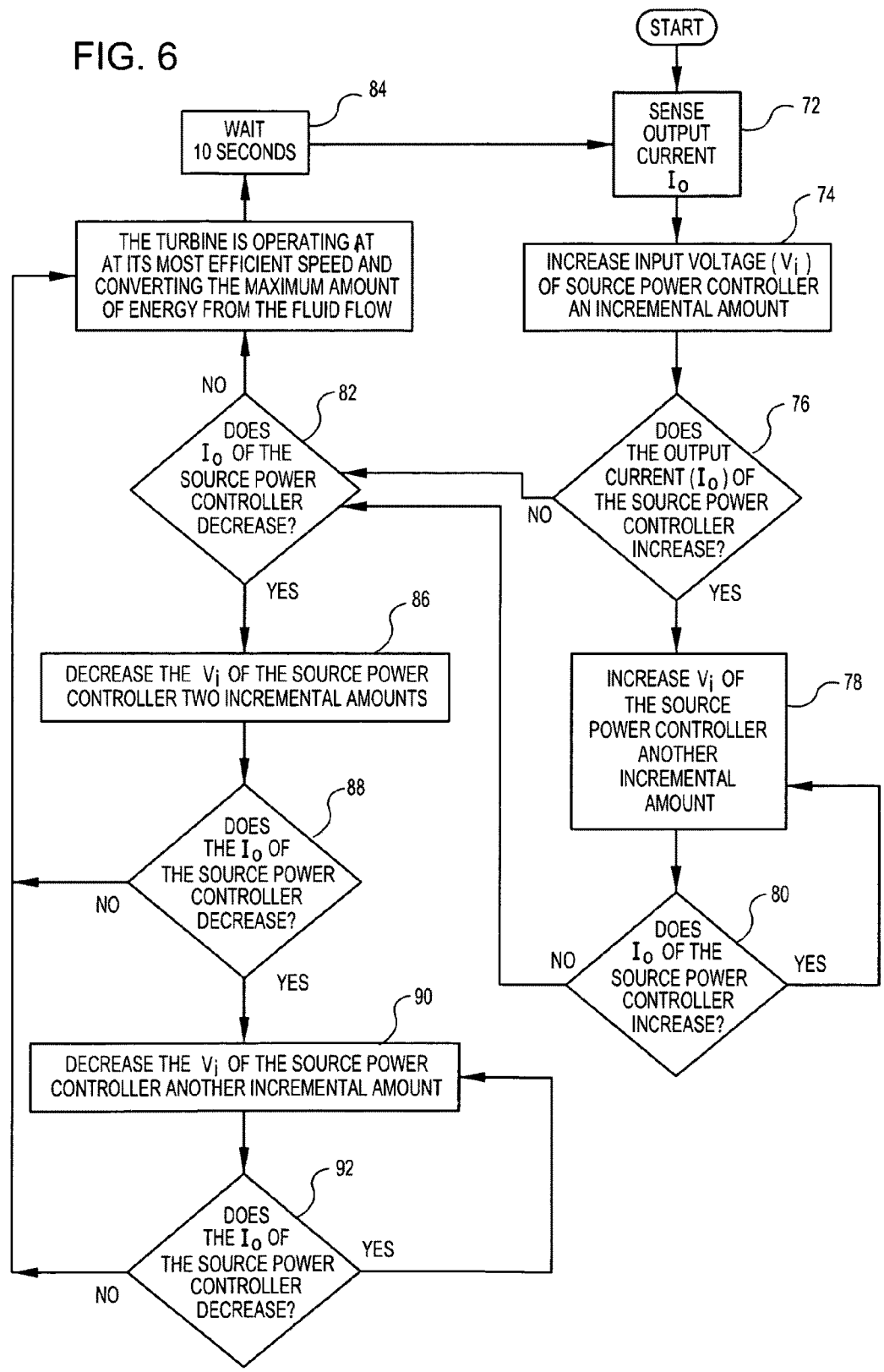
FIG. 6 is a flow diagram showing a method, according to an embodiment of the invention, for determining whether or not the amount of power generated by the power generation system shown in FIG. 4 is the maximum amount of power that can be generated by the system.
Figure 7:
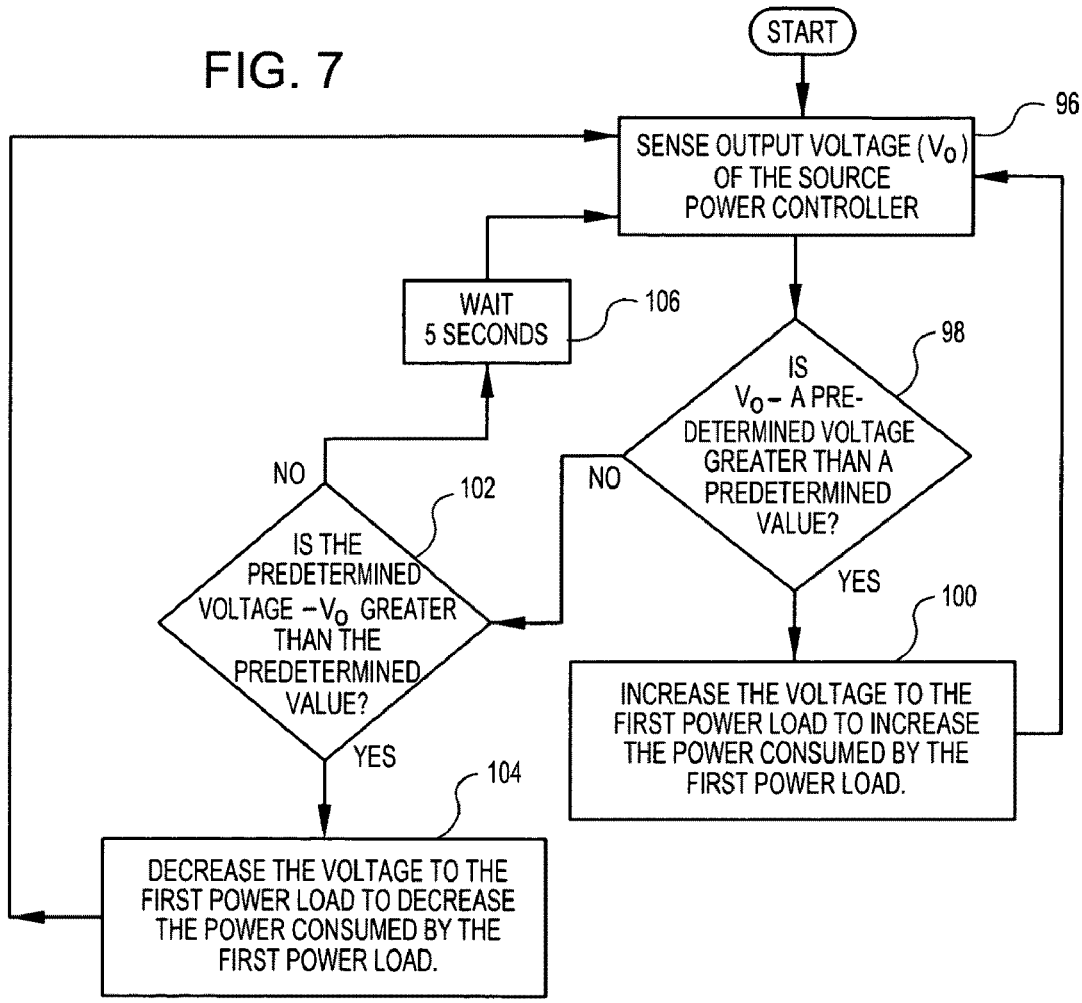
FIG. 7 is a flow diagram showing a method, according to an embodiment of the invention, for diverting power generated by the power generation system shown in FIG. 4.

As discussed in greater detail in conjunction with FIGS. 5-7, the power distribution controller 60 includes electronic circuitry that modifies the amount of power diverted to the first power load 58 to modify the amount of power generated by the generator 56. Because the amount of power distributed to the first power load 58 and the one or more second power loads 46 must equal the amount of power generated by the generator 56, modifying the power diverted to the first power load 58 effectively modifies the amount of power generated by the generator 56. As discussed elsewhere herein, modifying the amount of power generated by the generator 56 causes the turbine's shaft to speed up or slow down depending on whether the power generated increases or decreases. Typically, the power distribution controller 60 does not modify the amount of power to the one or more second power loads 46 because these loads (devices) are designed to consume a certain amount of power to work as designed. However, if a second power load 46 is designed to consume a varying amount of power, such a battery being charged, then the power distribution controller 60 may modify the power distributed to the second power load 46 as well.

By consuming more or less power from the generator 56, the rotational speed of the turbine's shaft can be adjusted, and, if possible for the existing water pressure and electrical power consumption requirements, the rotational speed of the turbine's shaft can be adjusted to its optimal speed. That is, the rotational speed at which the turbine 54 can extract the maximum amount of energy from the water flowing through the turbine 54, and thus the turbine 54 and generator 56, combined, can generate a maximum amount of electrical power from the existing pressure in the water flowing in the pipe 42.

In operation, the power distribution controller 60 monitors the amount of power consumed by the one or more second power loads 46, and determines whether or not the power received by the controller, which is also the power generated by the generator 56, is or substantially is the maximum amount of electrical power available for the existing water pressure. Then, in response to these the power distribution system 60 diverts power to the first power load to increase, decrease or maintain the amount of power generated by the generator 56.

Figure 1:
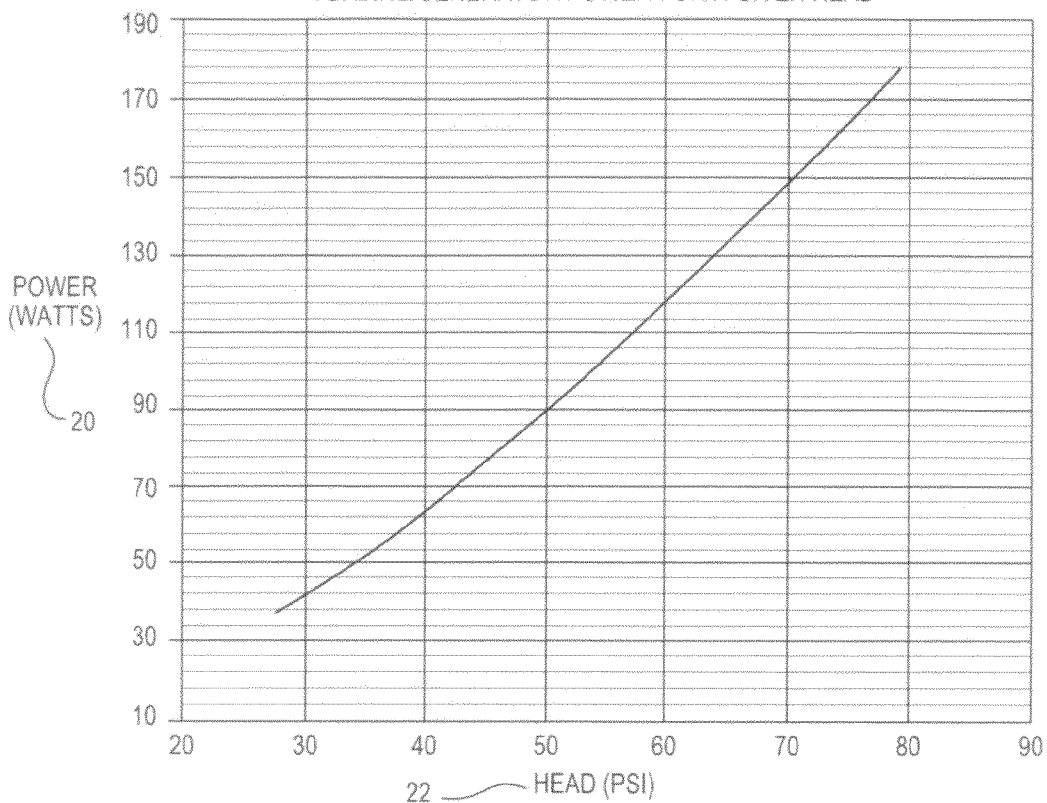
FIG. 1 is a graph showing a typical relationship between the amount of electric power that a conventional turbine-generator combination can generate from fluid flowing through the turbine, and the head—i.e. fluid pressure—of the fluid when it contacts the turbine's runner.
Figure 2:
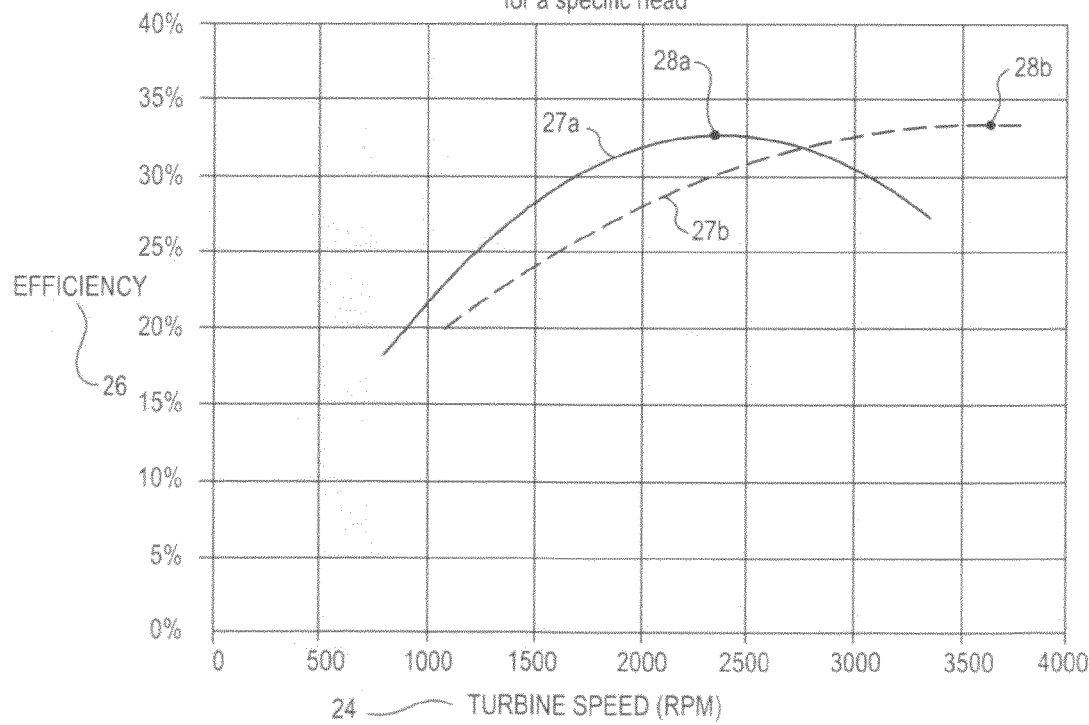
FIG. 2 is a graph showing a typical relationship, at two different specific fluid pressures, between the rotational speed of a conventional turbine's shaft and the percent of the total energy in the fluid flowing through the turbine that is converted into kinetic energy expressed in the rotating turbine shaft.
Figure 3:
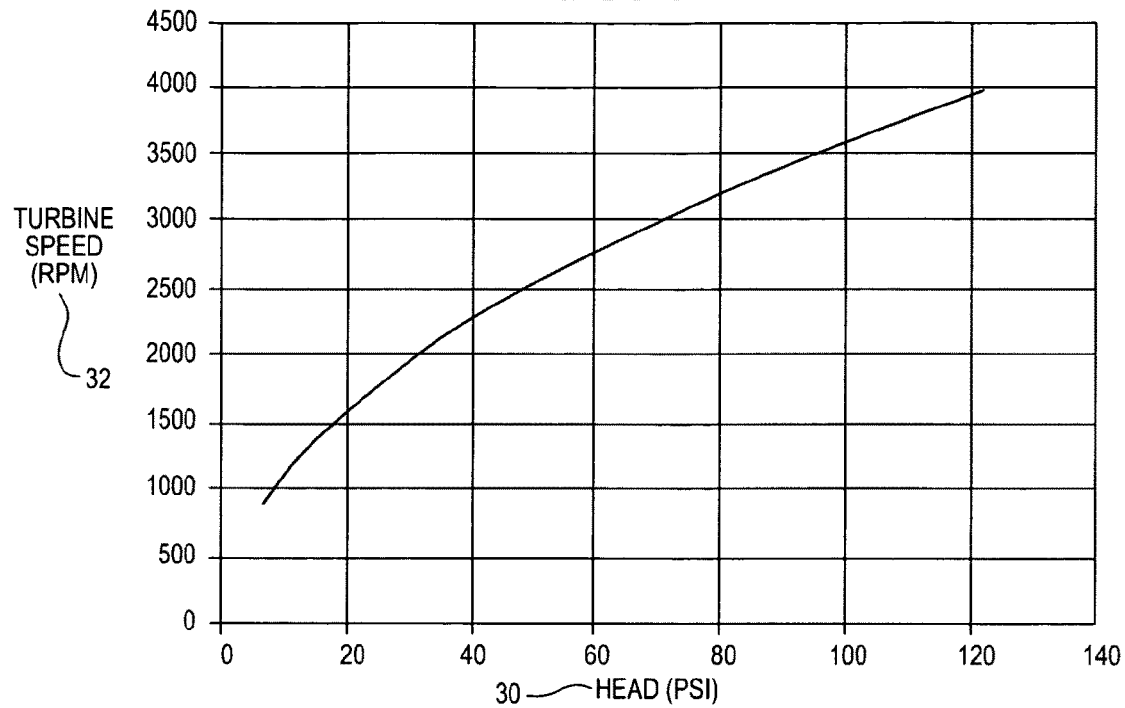
FIG. 3 is a graph showing a typical relationship between the head of a fluid flowing through the turbine when the fluid contacts the turbine's runner and the rotational speed of the turbine's shaft that provides the maximum percentage of the fluids total energy that is converted into kinetic energy expressed in the rotating turbine shaft.

For example, if the amount of power consumed by the one or more second power loads 46 remains constant, and the amount of power received by the controller 60 is less than the maximum amount of power available to be received—e.g. the maximum amount of power that the turbine 54 and generator 56 can generate from the existing pressure in the water (see FIG. 2) then, the power distribution controller 60 increases the amount of power diverted to the first power load 58 to increase the amount of power generated by the generator 56. This situation reflects an increase in the pressure in the water flowing through the turbine 54, that the power distribution controller 60 responds to by increasing the power diverted to the first power load 58. Increasing the power diverted to the first power load 58 causes the turbine's shaft to slow down. When the turbine's shaft rotates at its optimal speed for the specific water pressure, then the power distribution controller 60 increasing the amount of power diverted to the first power load 58. At this rotational speed the turbine 54 and generator 56 combination generates the maximum amount power from the pressure in the water flowing through the turbine, and the turbine's shaft rotates at a speed that maximizes the life of the turbine and its components.

If, however, the amount of power consumed by the one or more second power loads 46 increases, and the amount of power received by the controller 60 is equal to or substantially equal to the maximum amount of power available to be received then, the power distribution controller 60 decreases the amount of power diverted to the first power load 58 to maintain the amount of power generated by the generator 56. This, in turn, causes the turbine's shaft to maintain it's speed, which is the optimal speed because the amount of power received by the controller 60 is or substantially is the maximum amount of power available for the existing pressure water flowing through the turbine 54. When the speed of the turbine's shaft starts to increase, the electronic circuitry stops decreasing the amount of power diverted to the first power load 58. Thus, the turbine 54 and generator 56 combination generates the maximum amount power from the water flowing through the turbine 54, and the turbine's shaft rotates at a speed that maximizes the life of the turbine 54 and its components.

If, however, the amount of power consumed by the one or more second power loads 46 increases an amount X, and the amount of power received by the power distribution controller 60 is less than the maximum amount of power available to be received, by the same amount X, then, the controller 60 decreases the amount of power diverted to the first power load 58 to increase the amount of power generated by the generator 56. This, in turn, causes the turbine's shaft to speed up. When the turbine's shaft rotates at its optimal speed for the specific pressure in the water flowing through the turbine 54, then the turbine 54 and generator 56 combination generates the maximum amount power from the water flowing through the turbine 54, and the turbine's shaft rotates at a speed that maximizes the life of the turbine and its components.

If, however, the pressure in the water flowing through the turbine 54 decreases, and the amount of power consumed by the one or more second power loads 46 remains constant, then the amount of power received decreases. This causes the turbine 54 to be overburdened. Thus, the power distribution controller diverts less power to the first power load 58 to reduce the amount of power generated by the generator 56. This, in turn, causes the turbine's shaft to speed up. When the turbine's shaft rotates at its optimal speed for the existing pressure in the water flowing through the turbine 54, then the turbine 54 and generator 56 combination generates the maximum amount power from the water flowing through the turbine 54, and the turbine's shaft rotates at a speed that maximizes the life of the turbine and its components. If, on the other hand, the amount of power consumed by the one or more second power loads 46 is greater than the maximum amount of power available to be received by the controller 60 for the existing water pressure, then the controller 60 diverts all of the power generated by the generator 56 to the one or more second power loads 46.

Still referring to FIG. 4, the first power load 58 may be any desired equipment capable of consuming electrical power. For example, in this and certain other embodiments, the first power load 58 includes an electrically resistive heater that generates heat by resisting the flow of electrons, i.e. electrical current, around a circuit. In other embodiments, the first power load 58 may be one or more electrical lights, and/or an electrical power distribution network that distributes power to customers for a fee. If the first power load 58 is such a power distribution network, then the power provided to the network may be sold to the network. In yet other embodiments, the first power load 58 may be one or more batteries that are charged by the power that the power distribution controller 60 diverts to them. In such embodiments, the power distribution controller 60 may also monitor the power consumed by the battery as the battery charges and prevent excess power from being diverted to the battery to prevent overcharging the battery. If the power distribution controller 60 performs this function, then the first power load should also include other equipment capable of handling excess power that may need to be diverted away from the one or more second power loads 46.

Still referring to FIG. 4, the turbine 54 may be any desired turbine capable of converting energy in a flow of fluid into kinetic energy expressed as a rotating shaft. For example, in this and certain other embodiments, the turbine 54 may include a pump-as-turbine. In other embodiments the turbine may be another type of impulse turbine, such as a Pelton turbine, or any type of reaction turbine, such as a Francis turbine.

The generator 56 may be any desired generator capable of converting the kinetic energy in the rotating shaft of the turbine 54 into electrical power in an electrical circuit. For example, in this and certain other embodiments, the generator 56 may include a brushless, permanent magnet generator that generates alternating electrical current. In other embodiments, the generator may generate direct electrical current.

Still referring to FIG. 4, the power generation system 40 may include one or more additional components. For example, in this and certain other embodiments, the system 40 may include a pressure control valve 62 and a flow control valve 64. The pressure control valve 62 helps keep the pressure in the water leaving the turbine 54 equal to or substantially equal to the pressure in the water leaving the pressure reducing valve 52. The flow control valve 64 allows one to control the water flow through the turbine. This may be desirable if a situation arises in which the flow of water through the turbine 54 should be stopped. For example, if the turbine 54 or the generator 56 requires maintenance, then the flow of water through the turbine needs to be stopped to allow access to the turbine and/or generator.

FIG. 5 is a schematic diagram of the power distribution controller 60 shown in FIG. 4, according to an embodiment of the invention. The controller 60 distributes power generated by the generator 56 (FIG. 4) to the first power load 58 and the one or more second power loads 46, for simultaneous consumption. More specifically, a portion of the power generated by the generator 56 may be consumed by the first power load 58, while another portion of the power is being consumed by the one or more second loads 46. In this manner, the power distribution controller can modify the amount of power diverted to the first power load 58 to modify the amount of power generated by the generator 56.

The power distribution controller 60 includes a source-power controller 66 having electronic circuitry (not shown) that determines whether or not the amount of power that the power distribution controller 60 receives is equal to or substantially equal to the maximum amount of power that the turbine 54 (FIG. 4) and generator 56 combination can generate for the existing pressure in the water flowing through the turbine 54. The power distribution controller 60 also includes a second-power-load controller 68 having electronic circuitry (not shown) that monitors the amount of power consumed by the one or more second power loads 46. In addition, the power distribution controller 60 also includes a diversion-load controller 70 having electronic circuitry (not shown) that modifies the amount of power diverted to the first power load 58.

The electronic circuitry included in the source-power controller 66 may be any desired circuitry that is capable of providing electrical power having an output voltage $V_o$ that remains constant, from power having an input voltage $V_i$ that may vary over time. For example, in this and certain other embodiments, the electronic circuitry of the source-power controller 66 includes a direct current to direct current (DC-DC) converter, and processing circuitry that periodically adjusts, incrementally, the input voltage $V_i$, and then senses the output current $I_o$ for any change.

Likewise, the electronic circuitry included in each of the second-power-load controller 68 and the diversion-load controller 70 may be any desired circuitry that is capable of receiving electrical power having an input voltage (here the input voltage is equal to the output voltage $V_o$ of the source-power controller 66) and then providing the electrical power at an output voltage—$V_{o1}$ for the second-power-load controller 68 and $V_{o2}$ for the diversion-load controller 70—that may be different than or the same as the input voltage. For example, in this and certain other embodiments, the electronic circuitry of each of the controllers 68 and 70 includes a pulse-width modulator to modify the amount of power provided to the respective one or more second power loads 46 and first power load 58. The electronic circuitry of each of the controllers 68 and 70 also includes processing circuitry that periodically senses their respective output voltages $V_{o1}$ and $V_{o2}$ to determine if the amount of power being consumed has increased or decreased, and that accordingly modifies a respective one of the output voltages $V_{o1}$ and $V_{o2}$.

Other embodiments are possible. For example, the electronic circuitry of one or more of the three controllers 66, 68, and 70 may monitor, sense, adjust and/or modify the output voltage of the respective controller, not the input voltage. As another example, the electronic circuitry of one or more of the three controllers 66, 68, and 70 may sense at a moment in time an output voltage and an output current, then calculate the amount of power being consumed, then compare the calculated power to a power value stored in a database that represents the desired power output for the respective controller.

FIG. 6 is a flow diagram showing a method, according to an embodiment of the invention, for determining whether or not the amount of power generated by the generator 56 (FIG. 4) is the maximum amount of power that can be generated by the turbine 54 (FIG. 4) and generator 56 combination for the existing pressure in the water flowing through the turbine 54. During the discussion of this method references will be made to FIG. 5 to assist in the understanding of the method.

The source-power controller periodically increases the input voltage $V_i$ of the source-power controller 66, and then senses the output current $I_o$ for an increase or decrease. With the output voltage $V_o$ held constant or substantially constant, one need only sense the output current $I_o$ for an increase or decrease to determine if there is an increase or decrease in the power generated. If the output current $I_o$ remains the same or substantially the same, then the input power to the source-power controller 66—i.e. the power generated by the generator 56—is at or near the maximum amount of power that the turbine 54 and generator 56 combination can generate for the existing pressure in the water flowing through the turbine 54 (see point 28 in FIG. 2). If the output current $I_o$ increases, then the input power to the source-power controller 66 is below the maximum amount of power that the turbine 54 and generator 56 combination can generate for the existing pressure in the water flowing through the turbine 54, and the turbine's shaft rotates slower than the shaft's optimal speed. In this situation, the operation of the turbine 54 is on the portion of the curve 27a shown in FIG. 2 that is left of the point 28a in FIG. 2. If the output current $I_o$ decreases, then the input power to the source-power controller 66 is below the maximum amount of power that the turbine 54 and generator 56 combination can generate for the existing pressure in the water flowing through the turbine 54, and the turbine's shaft rotates faster than the shaft's optimal speed. In this situation, the operation of the turbine 54 is on the portion of the curve 27a shown in FIG. 2 that is right of the point 28a in FIG. 2.

The period between incremental increases in the input voltage $V_i$ may be any desired period. For example in this and certain other embodiments, the period is 10 seconds. In addition, the size of the incremental increases to the input voltage $V_i$ may be any desired increment. For example, in this and certain other embodiments, the input voltage $V_i$ is increased and decreased in increments of 0.05 volts.

In this and certain other embodiments, the first step 72 that the source-power controller 66 does to determine whether or not the amount of power generated by the generator 56 is the maximum amount of power that can be generated for the existing pressure in the water flowing through the turbine 54 is sense the output current $I_o$ to be able to compare a subsequent sense of the output current $I_o$ for any changes. Then, at step 74, the controller 66 increases the input voltage $V_i$ by 0.05 volts. Then, at step 76, the controller 66 senses the output current $I_o$ again, and compares this current with the previously sensed current for an increase. If the output current $I_o$ has increased, then, at step 78, the controller 66 increases the input voltage $V_i$ by another 0.05 volts. Then, at step 80, the controller 66 senses the output current $I_o$ again, and compares this current with the previously sensed current for another increase. If the output current $I_o$ has increased again, then the controller repeats steps 78 and 80 until the output current $I_o$ doesn't increase, at which point the controller 66 compares the output current with the immediately preceding sensed current for a decrease at step 82.

Note that, if in step 76, the controller 66 determines that the output current $I_o$ has not increased, then the controller 66 proceeds directly to step 82 to compare the output current $I_o$ with the previously sensed output current $I_o$ for a decrease. If the controller 66 determines that the output current $I_o$ has not decreased, then the controller proceeds to step 84, and waits 10 seconds before sensing the output current $I_o$ to again begin determining whether or not the amount of power generated by the generator 56 is the maximum amount of power that can be generated for the existing pressure in the water flowing through the turbine 54.

If the output current $I_o$ has decreased, then, at step 86, the controller 66 decreases the input voltage $V_i$ by 0.1 volts (twice the increment). Then, at step 88, the controller 66 senses the output current $I_o$ again, and compares this current with the previously sensed current for another decrease. If the output current $I_o$ has decreased, then, at step 90, the controller 66 decreases the input voltage $V_i$ by 0.05 volts. Then, at step 92, the controller 66 senses the output current $I_o$ again, and compares this current with the previously sensed current for another decrease. If the output current $I_o$ has decreased again, then the controller 66 repeats steps 90 and 92 until the output current $I_o$ doesn't decrease, at which point the controller 66 proceeds to step 84, and waits 10 seconds before sensing the output current $I_o$ to again begin determining whether or not the amount of power generated by the generator 56 is the maximum amount of power that can be generated for the existing pressure in the water flowing through the turbine 54.

FIG. 7 is a flow diagram showing a method, according to an embodiment of the invention, for diverting power generated by the power generation system shown in FIG. 4. During the discussion of this method references will be made to FIG. 5 to assist in the understanding of the method.

The diversion-power controller 68 periodically senses the output voltage $V_o$ of the source-power controller 66, and then compares output voltage $V_o$ with a predetermined voltage. If the difference between output voltage $V_o$ and the predetermined voltage is greater than a predetermined limit, then, depending on whether or not the output $V_o$ is greater than or less than the predetermined voltage, the diversion-power controller increases or decreases the amount of power diverted to the first power load 58 (FIG. 5).

The predetermined voltage may be any desired voltage. For example, in this and certain other embodiments, the predetermined voltage is the voltage required by the one or more second power loads 46 (FIG. 5) to properly operate. The predetermined limit may also be any desired limit. For example, in this and certain other embodiments, the predetermined limit is 0.2 volts. If the difference between the sensed output $V_o$ and the predetermined voltage is less than 0.2 volts, then the diversion-load controller maintains the power diverted to the first power load 58. If, however, the difference between the sensed output $V_o$ and the predetermined voltage is more than 0.2 volts, then the diversion-load controller increases the amount of power diverted to the first power load 58. If, however, the difference between the predetermined voltage and the sensed output voltage $V_o$ is more than 0.2 volts, then the diversion-load controller decreases the amount of power diverted to the first power load 58.

In this and certain other embodiments, the first step 96 that the diversion-power controller 68 does to divert power to the first power load 58 is sense the output voltage $V_o$. Then, at step 98, the controller 68 compares the difference between the sensed output voltage $V_o$ and a predetermined voltage. If the difference is greater than 0.2 volts, then at step 100 the controller 68, increases the output voltage $V_{o2}$ from the controller 68 to the first power load 58. Then, the controller 68 proceeds back to step 96 to sense the output voltage $V_o$ of the source-power controller 66, and then proceed based on the difference between the sensed output voltage $V_o$ and the predetermined voltage.

If, at step 98, the difference is less than 0.2 volts, then at step 102 the controller 68, compares the difference between the predetermined voltage and the output voltage $V_o$. If the difference is greater than 0.2 volts, then at step 104 the controller decreases output voltage $V_{o2}$ from the controller 68 to the first power load 58. Then, the controller 68 proceeds back to step 96 to sense the output voltage $V_o$ of the source-power controller 66, and then proceed based on the difference between the sensed output voltage $V_o$ and the predetermined voltage.

If, at step 102, the difference is less than 0.2 volts, then the controller 68 maintains the output voltage $V_{o2}$ from the controller 68 to the first power load 58, and proceeds to step 106 where the controller 68 waits 5 seconds before sensing the output voltage $V_o$ to again divert power to the first power load 58.

What is claimed is:

1. A power distribution controller comprising:
electronic circuitry operable to:
receive power;
distribute the power, for simultaneous consumption, to a first power load and to one or more second power loads;
monitor the amount of power consumed by the one or more second power loads;
determine whether or not the received power is or substantially is the maximum amount of power available to be received; and
in response to the amount of power consumed by the one or more second power loads and the amount of received power relative to the maximum amount of power available to be received, the electronic circuitry diverts power to the first power load to cause the received power to be or substantially be the maximum amount of power available to be received.

2. The controller of claim 1 wherein the electronic circuitry increases the amount of power diverted to the first power load in response to:
the amount of power consumed by the one or more second power loads remaining constant, and
the amount of power received being less than the maximum amount of power available to be received.

3. The controller of claim 1 wherein the electronic circuitry decreases the amount of power diverted to the first power load in response to:
an increase in the amount of power consumed by the one or more second power loads, and
the amount of power received being equal to or substantially equal to the maximum amount of power available to be received.

4. The controller of claim 1 wherein the electronic circuitry decreases the amount of power diverted to the first power load in response to:
an increase in the amount of power consumed by the one or more second power loads, and
the amount of power received being less than the maximum amount of power available to be received.

5. The controller of claim 1 wherein the electronic circuitry includes:

a source controller circuit operable to determine whether or not the amount of power generated is or substantially is the maximum amount of power available to be received, a second-power-load controller circuit operable to monitor the amount of power consumed by the one or more second power loads, and a diversion-load controller circuit operable to regulate the amount of power diverted to the first power load.

6. The controller of claim 1 wherein the electronic circuitry has a source power controller circuit that:

includes a DC-DC converter operable to receive an input voltage, and generate an output voltage and an output current;

senses the output current of the DC-DC converter;

modifies the input voltage of the DC-DC converter an incremental amount;

senses, again, the output current of the DC-DC converter; and compares the output current sensed after the input voltage of the DC-DC converter has been modified, to the output current sensed before the input voltage was modified, to determine whether or not the amount of power received is or substantially is the maximum amount of power available to be received.

7. The controller of claim 1 wherein the electronic circuitry has a second-power-load controller circuit that senses an input voltage to the one or more second power loads to monitor the amount of power consumed by the one or more second power loads.

8. The controller of claim 1 wherein the electronic circuitry includes a diversion-load controller circuit that:

senses an output voltage of a source controller circuit of the electronic circuit, and in response to a change in the output voltage, modifies an input voltage to the first power load to provide the proper amount of power to the first power load.

9. The controller of claim 1 wherein a turbine-generator combination generates the power received by the electronic circuitry from fluid flowing through the turbine, and the maximum amount of power available to be received is the maximum amount of power that the turbine-generator combination can generate from the fluid flowing through the turbine.

10. A power generation system comprising:

a turbine that rotates a shaft when fluid flows through the turbine;

a generator coupled to the turbine, that generates electrical power from the rotation of the turbine's shaft; and a system controller that:

distributes, for simultaneous consumption, the power generated by the generator to a first power load and to one or more second power loads, monitors the amount of power consumed by the one or more second power loads, determines whether or not the amount of power generated by the generator is or substantially is the maximum amount of power that the turbine-generator combination can generate from the fluid flowing through the turbine, and in response to the amount of power consumed by the one or more second power loads and the amount of generated power relative to the maximum amount of power that the turbine-generator combination can generate from the fluid flowing through the turbine, the system controller diverts to the first power load an amount of power that causes the turbine-generator combination to generate or substantially generate the maximum amount of power from the fluid flowing through the turbine.

11. The system of claim 10 wherein the fluid includes water.

12. The system of claim 10 wherein the turbine includes a pump-as-turbine.

13. The system of claim 10 wherein the generator includes a brushless, permanent magnet generator that generates alternating current.

14. The system of claim 10 wherein the system further includes a rectifier to convert alternating current generated by the generator into direct current.

15. The system of claim 10 wherein the system further includes an inverter to convert direct current into alternating current to be distributed to at least one of the first power load and the one or more second power loads.

16. The system of claim 10 wherein the one or more second power loads includes a battery to store electrical energy.

17. The system of claim 10 wherein:

the one or more second power loads includes a battery to store electrical energy, and the system controller includes a second-power-load controller that regulates the power to the battery to efficiently charge the battery.

18. The system of claim 10 wherein:

the one or more second power loads includes a battery to store electrical energy, and the system controller includes a second-power-load controller that reduces the amount of power to the battery as the battery's charge increases.

19. The system of claim 10 wherein the first power load includes a heater that generates heat by resisting the flow of electricity.

20. The system of claim 10 wherein the first power load includes a light that generates light by resisting the flow of electricity.

21. A direct current power generation system comprising:

a turbine that rotates a shaft when fluid flows through the turbine;

a generator coupled to the turbine, that generates electrical power from the rotation of the turbine's shaft;

a rectifier that converts the power generated by the generator into direct current power; and a system controller that:

distributes, for simultaneous consumption, the power generated by the generator to a first power load and to one or more second power loads, monitors the amount of power consumed by the one or more second power loads, determines whether or not the amount of power generated by the generator is or substantially is the maximum amount of power that the turbine-generator combination can generate from the fluid flowing through the turbine, and in response to the amount of power consumed by the one or more second power loads and the amount of generated power relative to the maximum amount of power that the turbine-generator combination can generate from the fluid flowing through the turbine, the system controller diverts to the first power load an amount of power that causes the turbine-generator combination to generate or substantially generate the maximum amount of power from the fluid flowing through the turbine.

22. The system of claim 21 wherein the fluid includes water.

23. The system of claim 21 wherein the turbine includes a pump-as-turbine.

24. The system of claim 21 wherein the generator includes a brushless, permanent magnet generator that generates alternating current.

25. The system of claim 21 wherein the one or more-second power loads includes a battery to store electrical energy.

26. The system of claim 21 wherein:
the one or more second power loads includes a battery to store electrical energy, and
the system controller includes a second-power-load controller that reduces the amount of power to the battery as the battery's charge increases.

27. The system of claim 21 wherein the first power load includes a heater that generates heat by resisting the flow of electricity.

28. A method for distributing power to a first power load and to one or more second power loads, the method comprising:
receiving power;
monitoring the amount of power consumed by the one or more second power loads;
determining whether or not the amount of power received is or substantially is the maximum amount of power that is available to be received; and
in response to the amount of power consumed by the one or more second power loads and the amount of power received relative to the maximum amount of power that is available to be received, diverting to the first power load an amount of power that causes the amount of power received to be or substantially be the maximum amount of power that is available to be received.

29. The method of claim 28 wherein diverting power to the first power load includes diverting more power in response to:
the amount of power consumed by the one or more second power loads remaining constant, and
the amount of power received being less than the maximum amount of power available to be received.

30. The method of claim 28 wherein diverting power to the first power load includes diverting less power in response to:
an increase in the amount of power consumed by the one or more second power loads, and
the amount of power received being equal to or substantially equal to the maximum amount of power available to be received.

31. The method of claim 28 wherein diverting power to the first power load includes diverting less power in response to:
an increase in the amount of power consumed by the one or more second power loads, and
the amount of power received by the generator being less than the maximum amount of power available to be received.

32. The method of claim 28 wherein monitoring the amount of power consumed by the one or more second power loads includes monitoring the input voltage of the one or more second power loads.

33. The method of claim 28 wherein determining whether or not the amount of power received is or substantially is the maximum amount of power available to be received includes:
sensing the output current of the DC-DC converter coupled to the generator of turbine-generator combination;
modifying the input voltage of the DC-DC converter an incremental amount;
sensing, again, the output current of the DC-DC converter; and
comparing the output current sensed after modifying the input voltage of the DC-DC converter to the output current sensed before modifying the input voltage.

34. The method of claim 28 wherein diverting power to the first power load includes:
sensing an output voltage of a DC-DC converter, and
in response to a change in the output voltage, modifying an input voltage to the first power load to provide the proper amount of power to the first power load.

35. The method of claim 28 wherein the first power load includes a heater operable to generate heat, and diverting power to the first power load includes the heater consuming the power to generate heat.

36. The method of claim 28:
further comprising generating power from a fluid flowing through a turbine of a turbine-generator combination, and
the power received includes the power generated by the turbine-generator combination, and
the maximum amount of power available to be received is the maximum amount of power that the turbine-generator combination can generate from the fluid flowing through the turbine.

37. The method of claim 28 wherein the power generated includes alternating current.

38. The method of claim 28 wherein the power generated includes alternating current, and the method further comprises rectifying the alternating current into direct current before determining whether or not the amount of power received is or substantially is the maximum amount of power available to be received.

* * * * *